US012650491B2

(12) United States Patent
Noh et al.

(10) Patent No.: US 12,650,491 B2
(45) Date of Patent: Jun. 9, 2026

(54) METHOD AND SYSTEM FOR DETECTING OBJECT

(71) Applicants:HYUNDAI MOTOR COMPANY, Seoul (KR); KIA CORPORATION, Seoul (KR)

(72) Inventors: Mi Rim Noh, Jeonju-si (KR); Ju Heon Baeg, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 411 days.

(21) Appl. No.: 18/140,246

(22) Filed: Apr. 27, 2023

(65) Prior Publication Data

US 2024/0085526 A1 Mar. 14, 2024

(30) Foreign Application Priority Data

Sep. 14, 2022 (KR) ......................... 10-2022-0115512

(51) Int. Cl.
| | |
|---|---|
| *G01S 7/48* | (2006.01) |
| *G01S 17/89* | (2020.01) |
| *G01S 17/931* | (2020.01) |

(52) U.S. Cl.
CPC ............ *G01S 7/4802* (2013.01); *G01S 17/89* (2013.01); *G01S 17/931* (2020.01)

(58) Field of Classification Search
CPC .......... G01S 17/10; G01S 17/42; G01S 17/89; G01S 17/931; G01S 7/4802; G01S 7/4808
USPC ....................................................... 702/159
See application file for complete search history.

(56) References Cited

U.S. PATENT DOCUMENTS

| | | | | |
|---|---|---|---|---|
| 2014/0169630 | A1* | 6/2014 | Fukata | ................... B60R 1/002 |
| | | | | 382/103 |
| 2023/0350034 | A1* | 11/2023 | Serafin | ................. G01S 7/4808 |

FOREIGN PATENT DOCUMENTS

| | | |
|---|---|---|
| CN | 108549084 A | 9/2018 |
| CN | 110728753 A | 1/2020 |
| KR | 10-2020-0126141 A | 11/2020 |
| KR | 10-2225387 B1 | 3/2021 |
| KR | 10-2021-0064067 A | 6/2021 |

(Continued)

OTHER PUBLICATIONS

Bansal et al, "Pointillism: Accurate 3D Bounding Box Estimation with Multi-Radars", SenSys â20, Nov. 16-19, 2020, Virtual Event, Japan (Year: 2020).*

*Primary Examiner* — John H Le
(74) *Attorney, Agent, or Firm* — Morgan Lewis & Bockius LLP

(57) ABSTRACT

The present disclosure relates to a method and a system for detecting an object. A method of detecting an object, according to an embodiment of the present disclosure, includes determining whether the object in a region of interest of a (host) vehicle is in a turning state or a straight moving state, determining a location of a reference point for the object based on the determination, extracting first outline points from LiDAR points for the object, which are included in a point cloud received from a LiDAR sensor, based on the reference point, generating at least one virtual point based on a length of a line segment connecting the first outline points, and generating a bounding box of the object corresponding to a heading direction of the object based on second outline points including the first outline points and the at least one virtual point.

18 Claims, 8 Drawing Sheets

(56) References Cited

FOREIGN PATENT DOCUMENTS

| KR | 10-2275671 B1 | 7/2021 |
| KR | 10-2022-0053866 A | 5/2022 |

* cited by examiner

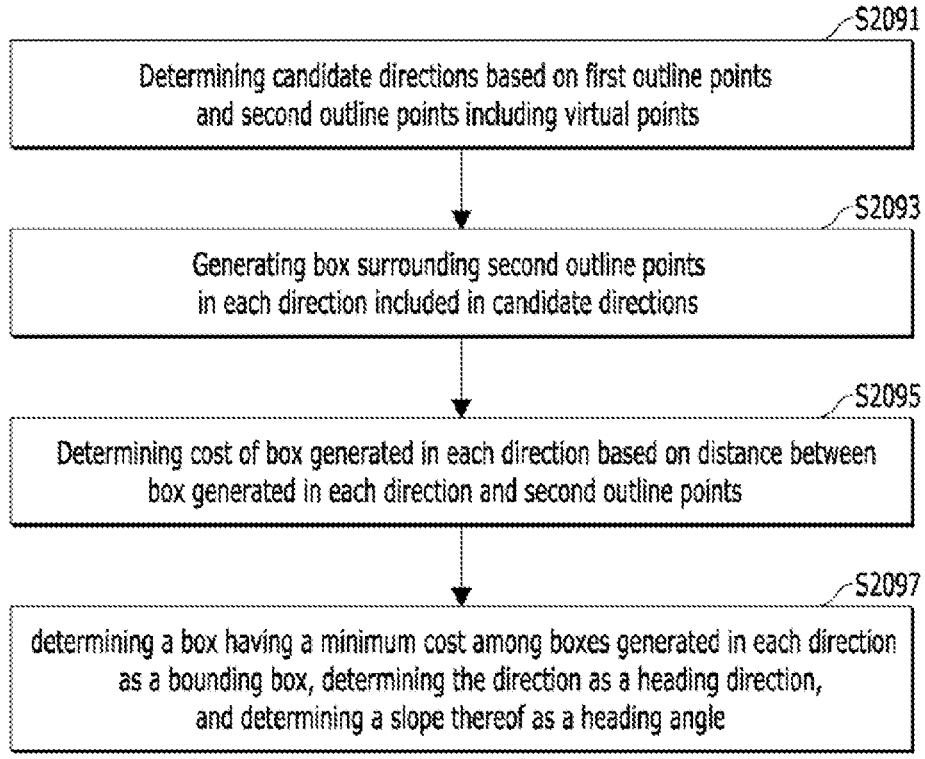

S2091

Determining candidate directions based on first outline points
and second outline points including virtual points

S2093

Generating box surrounding second outline points
in each direction included in candidate directions

S2095

Determining cost of box generated in each direction based on distance between
box generated in each direction and second outline points

S2097 determining a box having a minimum cost among boxes generated in each direction
as a bounding box, determining the direction as a heading direction,
and determining a slope thereof as a heading angle

METHOD AND SYSTEM FOR DETECTING OBJECT

CROSS-REFERENCE TO RELATED APPLICATION

The present application claims priority to Korean Patent Application No. 10-2022-0115512, filed on Sep. 14, 2022, the entire contents of which is incorporated herein by reference in its entirety.

TECHNICAL FIELD

The present disclosure relates to a method and a system for detecting an object.

BACKGROUND

Autonomous driving of a vehicle requires accurate recognitions of the surrounding environment, that is, objects around the vehicle.

To this end, the vehicle may comprise various sensor devices such as a camera, a radar, and/or a LiDAR, and technology for detecting, tracking, and/or classifying surrounding objects based on sensor data may be applied.

For example, a method of generating a rectangular box corresponding to an object of interest from point cloud data obtained through a LiDAR sensor has been developed as a part of object detection technology.

However, in respect of a target vehicle located proximately at the front side and/or rear side of the host vehicle, the conventional method for detecting an object has a problem in that point data of a lateral side of the target vehicle is insufficiently obtained. This is because a laser irradiation region scanning a lateral side surface of the target vehicle is small.

For this reason, there is a problem in that the detected heading of the proximate vehicle cannot properly represent the actual heading direction.

BRIEF SUMMARY

An embodiment of the present disclosure provides a method and a system for detecting an object capable of representing an actual driving direction of a nearby vehicle turning in a proximate region of the front and/or rear of the vehicle.

For example, the method and system for detecting an object of the present disclosure overcomes the limit of shortage of point data in the front and/or rear proximate region of the vehicle. Accordingly, the actual moving direction of the proximate target vehicle turning in the proximate region may be detected.

A method of detecting an object, according to an embodiment of the present disclosure, includes determining whether the object in a region of interest of a (host) vehicle is in a turning state or a straight moving state, determining a location of a reference point for the object based on the determination, extracting first outline points from LiDAR points for the object, which are included in a point cloud received from a LiDAR sensor, based on the reference point, generating at least one virtual point based on a length of a line segment connecting the first outline points, and generating a bounding box of the object corresponding to a heading direction of the object based on second outline points including the first outline points and the at least one virtual point.

In at least one embodiment of the present disclosure, the determining of whether the object is in a turning state or a straight moving state includes determining two points corresponding to minimum and maximum values of y-axis which is a lateral axis with respect to the vehicle among the LiDAR points, determining that the object is in the turning state when a slope of a line segment connecting the two points is less than a predetermined threshold slope, and determining that the object is in the straight moving state when the slope of the line segment is equal to or greater than the threshold slope.

In at least one embodiment of the present disclosure, the determining a location of a reference point for the object includes: in response to the object in the turning state, determining the location of the reference point based on the locations of the points in local quadrants of the vehicle, and in response to the object in the straight moving state, determining a location corresponding to any one point of the vehicle as the location of the reference point.

In at least one embodiment of the present disclosure, the local quadrants are generated based on a cluster box of the object generated based on the LiDAR points.

In at least one embodiment of the present disclosure, in response to the object in the turning state, the determining a location of a reference point includes: determining the location of the reference point as a first point at a right side of the object in response to the LiDAR points located in a second quadrant, a third quadrant, and a fourth quadrant among the local quadrants, and determining the location of the reference point as a second point at a left side of the object in response to the LiDAR points located in a first quadrant, the second quadrant, and the third quadrant among the local quadrants.

In at least one embodiment of the present disclosure, the generating at least one virtual point includes: determining two outline points of a line segment having a length equal to or greater than a predetermined threshold length among line segments connecting two adjacent points of the first outline points, and generating the at least one virtual point between the two outline points.

In at least one embodiment of the present disclosure, the generating a bounding box of the object corresponding to a heading direction includes: determining candidate directions based on the second outline points, and generating a plurality of boxes, each box of the plurality of boxes surrounding the second outline points generated in each of the candidate directions, determining a cost of each box based on distances between the second outline points in the each box and nearest edges of the each box, each of the distances being a perpendicular distance from one of the second outline points to a corresponding nearest edge of the each box, and generating the bounding box surrounding the points and having a heading angle corresponding to a direction of a box having a minimum cost among the plurality of boxes.

In at least one embodiment of the present disclosure, the determining candidate directions includes: determining a slope of each line segment connecting two adjacent points among the second outline points as the candidate direction, wherein each of the line segments corresponds to a portion of an outline of the object.

In at least one embodiment of the present disclosure, the determining cost of each box includes calculating a square of the perpendicular distance for each of the second outline points, and determining a value obtained by summing all calculated squares of the perpendicular distances for the second outline points as the cost of the each box.

A system for detecting an object, according to an embodiment of the present disclosure, comprises an interface configured to receive a point cloud including points (hereinafter referred to as LiDAR points) of a target object from a LiDAR sensor of a host vehicle, and a processor configured to be in communication with or electrically connected to the interface, wherein the processor is configured to determine whether an object in a region of interest is in a turning state or a straight state, determine a location of a reference point for the object based on the determination, extract first outline points of the object from the LiDAR points based on the reference point, generate at least one virtual point based on a length of a line segment connecting two adjacent points of the first outline points, and generate a bounding box corresponding to a heading direction of the object based on second outline points which include the first outline points and the at least one virtual point.

In at least one embodiment of the present disclosure, the processor determines two points corresponding to minimum and maximum values of y-axis which is a lateral axis with respect to the host vehicle among the LiDAR points, determines that the object is in the turning state when a slope of a line segment connecting the two points is less than a predetermined threshold slope, and determines that the object is in the straight moving state when the slope of the line segment is equal to or greater than the predetermined threshold slope.

In at least one embodiment of the present disclosure, in response to the object in the turning state, the processor determines a location of a reference point based on locations of the LiDAR points in local quadrants, and in response to the object in the straight moving state, the processor determines a location corresponding to one point of the vehicle as the location of the reference point.

In at least one embodiment of the present disclosure, the local quadrants are generated based on a cluster box of the object generated based on the LiDAR points.

In at least one embodiment of the present disclosure, the processor determines the location of the reference point as a first point at a right location from the object in response to the LiDAR points located in a second quadrant, a third quadrant, and a fourth quadrant of the local quadrants, and the processor determines the location of the reference point as a second point at a left location from the object in response to the LiDAR points located in a first quadrant, the second quadrant, and the third quadrant of the local quadrants.

In at least one embodiment of the present disclosure, the processor is further configured to determine two outline points of a line segment having a length equal to or greater than a predetermined threshold length among line segments connecting two adjacent points of the first outline points, and generate the at least one virtual point between the two outline points.

In at least one embodiment of the present disclosure, the processor is further configured to determine candidate directions based on the second outline points, generating a plurality of boxes, each box of the plurality of boxes surrounding the second outline points generated in each of the candidate directions, determine a cost for each of the plurality of boxes based on distances between the second outline points in the each box and nearest edges of the each box, each of the distances being a perpendicular distance from one of the second outline points to a corresponding nearest edge of the each box, and determine the bounding box having a heading angle corresponding to a direction of a box having a minimum cost among the plurality of boxes.

In at least one embodiment of the present disclosure, the processor is further configured to determine each candidate direction based on a slope of each line segment connecting two adjacent points of the second outline points, and wherein the each line segment corresponds to a portion of an outline of the object.

In at least one embodiment of the present disclosure, the processor is configured to calculate a square of the perpendicular distance for each of the second outline points, and determine a value obtained by summing all calculated squares of the perpendicular distances for the second outline points as a cost of the each box.

Due to the method and system for detecting an object according to the present disclosure, an object located in a proximate region to a vehicle can be detected with a more accurate result, i.e., for example, a close target vehicle can be detected with its actual traveling direction.

BRIEF DESCRIPTION OF THE DRAWINGS

FIGS. 3 to 5 are diagrams for describing a system for detecting an object of a vehicle according to an embodiment of the present disclosure.

FIG. 6 is a detailed flowchart of a bounding box generation operation of a system for detecting an object of a vehicle according to an embodiment.

FIG. 7 is a diagram for describing an operation of generating a boundary box by a system for detecting an object of a vehicle according to an embodiment.

DETAILED DESCRIPTION

Hereinafter, embodiments of the present disclosure will be described with reference to the accompanying drawings.

Figure 1:
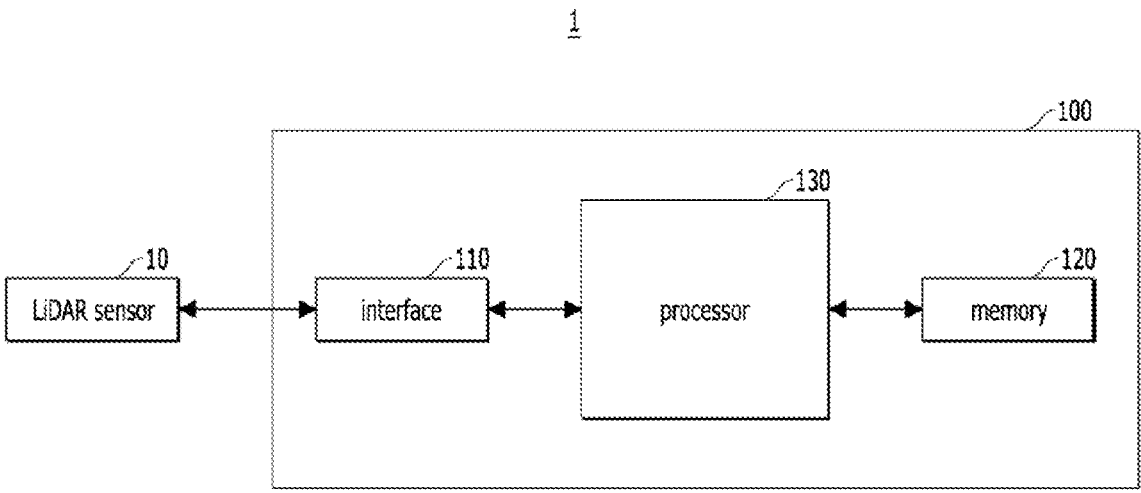
FIG. 1 is a block diagram of a vehicle according to an embodiment.

FIG. 1 is a block diagram of a vehicle according to an embodiment.

The vehicle 1 may include a LiDAR sensor 10 and a system 100 for detecting an object.

One or more LiDAR sensors 10 may be provided, and may be mounted to an exterior of the vehicle 1 to emit laser pulses toward the surroundings to generate LiDAR data, that is, a point cloud.

The system 100 may comprise an interface 110, a memory 120, and/or a processor 130.

The interface 110 may transmit commands or data input from another device such as the LiDAR sensor 10 or a user to another component of the system 100, or may output commands or data received from another component of the system 100 to another device of the vehicle 1.

The interface 110 may comprise a communication module (not shown) to communicate with other devices of the vehicle 1, for example, the LiDAR sensor 10.

For example, the communication module may perform communication over a vehicle communication network, for example, controller area network (CAN) communication and/or local interconnect network (LIN) communication. Further, the communication module may comprise a wired communication module (e.g., a power line communication module) and/or a wireless communication module (e.g., a cellular communication module, a Wi-Fi communication module, a short-range wireless communication module, and/or a global navigation satellite system (GNSS) communication module).

The memory 120 may store various data or software programs used by at least one component of the system 100 and input/output data thereof.

The memory 120 may comprise a non-volatile memory such as a cache, a Read Only Memory (ROM), a Programmable ROM (PROM), an Erasable Programmable ROM (EPROM), an Electrically Erasable Programmable ROM (EEPROM), and/or a flash memory, and/or a volatile memory such as a Random Access Memory (RAM).

The processor 130 (also referred to as a control circuit or a controller) may control at least one other component (e.g., a hardware component (e.g., the interface 110 and/or the memory 120) and/or software (a software program)) of the system 100 and may perform various processing and operations of data. According to an exemplary embodiment of the present disclosure, the processor 130 may include a processor (e.g., computer, microprocessor, CPU, ASIC, circuitry, logic circuits, etc.) and an associated non-transitory memory storing software instructions which, when executed by the processor, provides the functionalities of the processor 130 as described here. Herein, the memory and the processor may be implemented as separate semiconductor circuits. Alternatively, the memory and the processor may be implemented as a single integrated semiconductor circuit. The processor 130 may embody one or more processor(s).

The processor 130 may perform a pre-processing process and a process for clustering the point cloud received from the LiDAR sensor 10. For example, the processor 130 may perform a pre-processing process of removing ground data, etc. from the point cloud, and generate at least one cluster box by grouping points of the pre-processed point cloud into one or more meaningful shaped clusters, that is, by grouping points expected to belong to the same object into the same cluster.

For example, the processor 130 may cluster points of an object located in a region close to the vehicle 1, for example, a proximate vehicle, in the point cloud.

The processor 130 may determine a predetermined proximate region as a region of interest (ROI), and may determine whether an object in the region of interest, that is, the proximate object, is in a straight moving state or a turning state. For example, the processor 130 may determine a region within a predetermined distance from the host vehicle 1 as an ROI, and may determine an object in the ROI as a proximate target object (e.g., a proximate vehicle).

The processor 130 may determine the location of the reference point with respect to the object based on the determination of whether the proximate object is in a straight moving state or a turning state.

When the proximate object is in a straight moving state, the processor 130 may determine a predetermined point (e.g., a center point of a front bumper) of the host vehicle 1 as the location of the reference point.

When the proximate object is in the turning state, the processor 130 may determine the location of the reference point based on the locations of the points of the object in local quadrants.

In this case, for example, the processor 130 may determine a reference point as a specific location with respect to the corresponding object in the step of extracting representative points (also referred to as sampling points) for the corresponding object. For example, the reference point may be differently determined for a plurality of proximate objects.

This is helpful in solving a problem of insufficient point data on the side of the front proximate object of the host vehicle 1 as one location on the host vehicle 1 is determined as the location of the reference point for all objects.

Determining the location of the reference point differently according to the straight moving state or the turning state of the proximate object is to prevent a situation where the headings for the object are unstably determined by time as the location of the reference point is determined based on the locations of the points of the object in the straight moving state.

The processor 130 may extract outline points (hereinafter, referred to as first outline points) from the points of the object based on the reference point determined as described above.

For example, the processor 130 may extract representative points from points of the object based on the reference point, and may extract outline points from the representative points by using a convex hull algorithm. The extraction of the representative points and the extraction of the outline points may be implemented by a conventional method and thus the detailed description is omitted.

The processor 130 may generate at least one virtual point based on a length of a line segment connecting the extracted outline points.

For example, when the length of the line segment connecting a first outline point and a second outline point is equal to or greater than a predetermined threshold length (x[m]), it may mean that there is a region (also referred to as a sparse region) in which scanned points are relatively smaller than those in other regions. To complement the sparse region, the processor 130 may generate one or more virtual points between the first outline point and the second outline point. In this case, the virtual point may be generated to satisfy a minimum distance y[m] between points of the sparse region.

The processor 130 may generate a bounding box of the object corresponding to a heading direction of the object, based on outline points (hereinafter, referred to as second outline points) including the first outline points and the at least one virtual point.

For example, the processor 130 may determine candidate directions, each of which may indicate a candidate moving direction of the object, based on the second outline points, and may determine one among the candidate directions. In addition, the processor 130 may determine the determined direction as the heading direction of the corresponding object and generate the bounding box surrounding points for the object.

Figure 2:
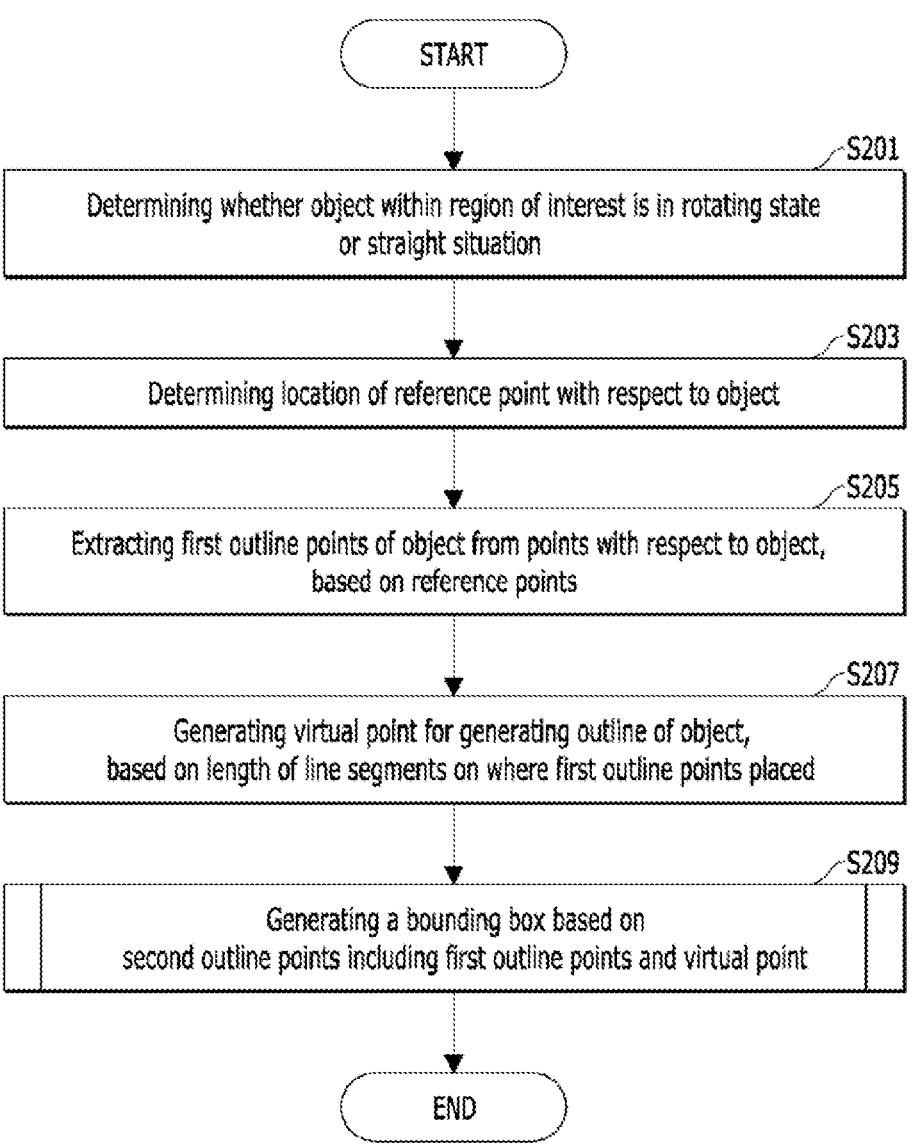
FIG. 2 is a flowchart of an operation of a system for detecting an object of a vehicle according to an embodiment.

FIG. 2 is a flowchart illustrating an operation of the system 100 (and/or the processor 130) of the host vehicle 1 according to an embodiment.

Referring to FIG. 2, the system 100 may determine whether the object in the region of interest of the host vehicle 1 is in a turning state or a straight moving state in operation S201.

Figure 3:
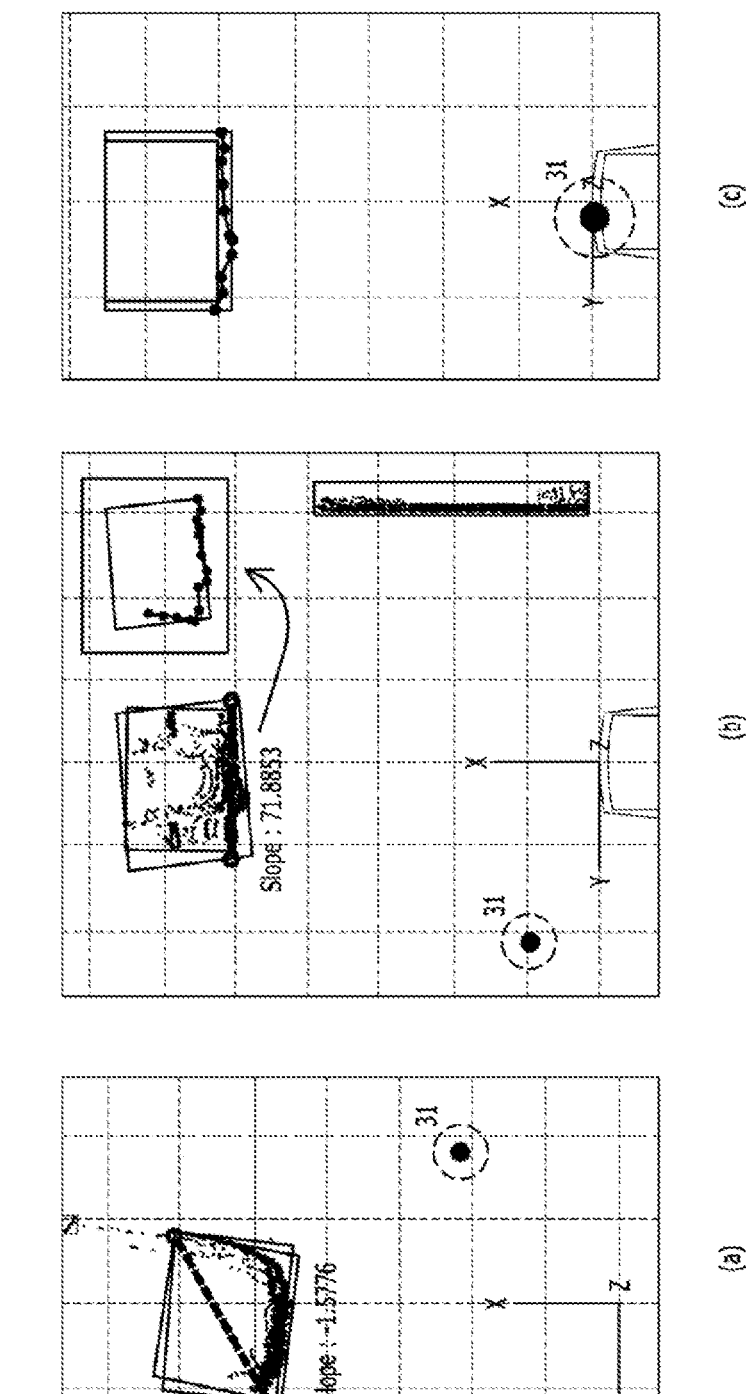

Referring to FIG. 3, when the system 100 distinguishes a turning object from a straight object, two points corresponding to minimum and maximum y-axis values among points obtained through the LiDAR sensor 10, for example, points of a front vehicle, may be used. Also, the system 100 may determine a slope (hereinafter, referred to as a first slope) of a line segment connecting a point corresponding to the minimum value and a point corresponding to the maximum value.

In addition, the system 100 may determine that the object is in the turning state when the first slope is less than a predetermined threshold value (|k|).

In addition, the system 100 may determine that the vehicle is in a straight moving state when the first slope is equal to or greater than the threshold value.

For an assumed example, if the threshold value |k|=10 and the first slope is −1.5776 as illustrated in FIG. 3(a), it may be determined that the object is in the turning state.

Also, for example, if the threshold value |k|=10 and the first slope is 71.8853 as illustrated in FIG. 3(b), it may be determined that the object is in the straight moving state.

The system 100 may determine the location of the reference point with respect to the corresponding proximate object based on whether the object is in a turning state or a straight moving state (S203).

Referring to FIG. 3, the system 100 may variably determine the location of the reference point with respect to an object according to a situation of the object within the region of interest.

For example, when the location of a predetermined point (e.g., a central point of a front bumper) of the host vehicle 1 is set as a default location of the reference point and it is determined that the front vehicle is in a turning state as illustrated in FIG. 3(a), the location of the reference point 31 for the corresponding object may be changed.

In addition, when it is determined that the front vehicle drives straight as shown in FIG. 3(b), the location of the reference point 31 may be determined as the default location as shown in FIG. 3(c).

When a proximate object is in a straight moving state, the system 100 may determine a location of the reference point for the corresponding object as the default location.

When the proximate object is in the turning state, the location of the reference point may be determined based on the locations of the LiDAR points in local quadrants.

Figure 4:
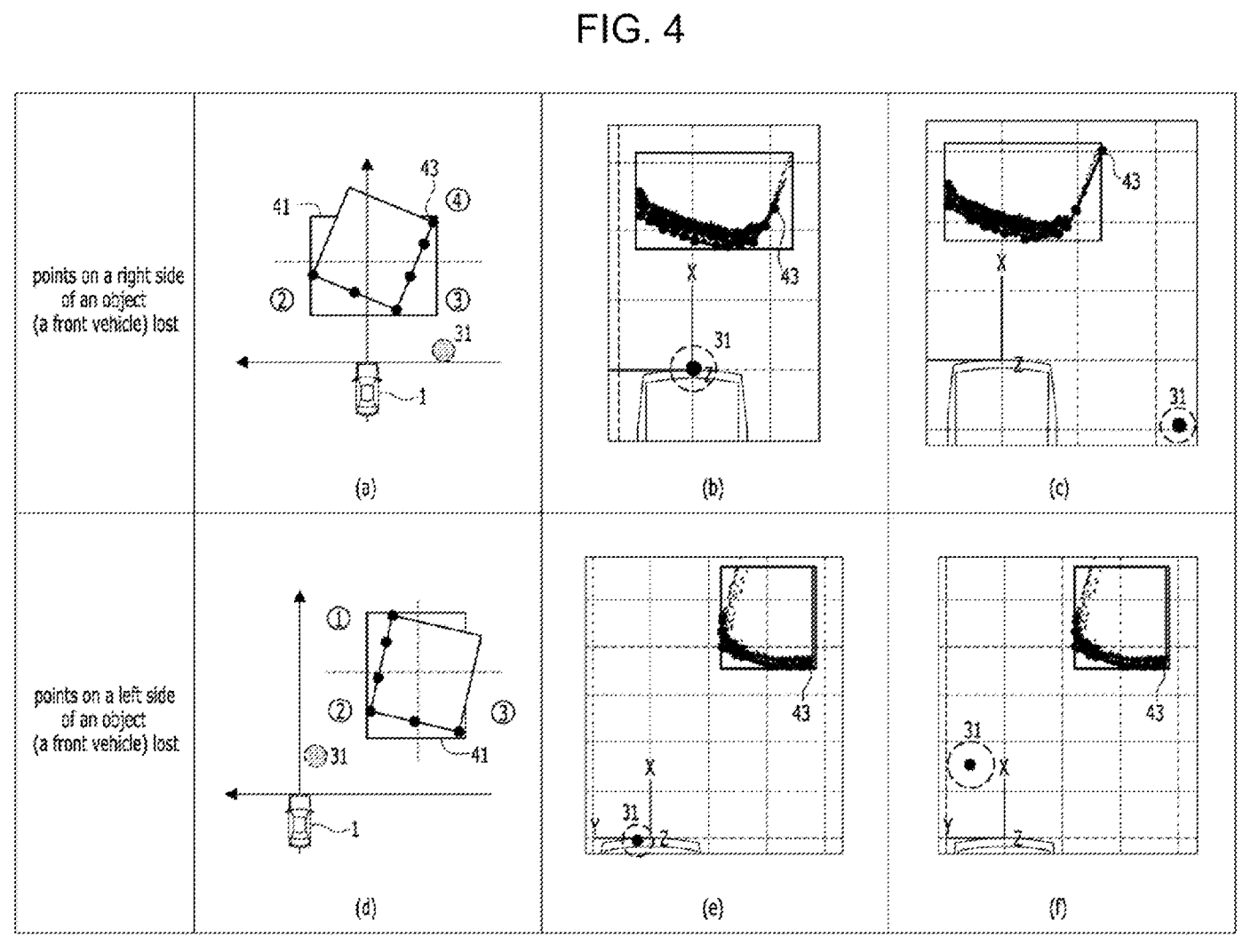

For example, the local quadrants may be generated based on the cluster box 41 of the object generated based on the points obtained from the LiDAR sensor 10, as shown in (a) and (d) of FIG. 4. For example, the local quadrants may be determined as the center of the cluster box 41 being the origin, the x-axis being arranged along the longitudinal direction and the y-axis being arranged along the transverse direction.

Referring to FIG. 4(a), when points of the right side of an object, for example, a front vehicle, are lost, points of the object are located in a second quadrant (②), a third quadrant (③), and a fourth quadrant (④) of the local quadrants.

In addition, referring to FIG. 4(d), when the points of the left lateral side of the object, for example, the front vehicle, are lost, it can be seen that the points of the object are located in the first quadrant (①), the second quadrant (②), and the third quadrant (③) of the local quadrants.

In order to minimize the loss of the LiDAR points, that is, in order to obtain as many LiDAR points as possible, when the LiDAR points are distributed in the second quadrant (②), the third quadrant (③), and the fourth quadrant (④) of the local quadrants, the system 100 may determine the location of the reference point as any one point (hereinafter, referred to as a first point) at the right side of the corresponding object.

For example, the system 100 may change and determine the location of the reference point 31, which was at the default location of the center of the front bumper of the host vehicle 1 as illustrated in FIG. 4(b), to any one point at the right side of the corresponding object as illustrated in FIG. 4(c).

In addition, when the points of the object are located in the first quadrant (①), the second quadrant (②), and the third quadrant (③) of the local quadrants, the system 100 may determine the location of the reference point as any one point (hereinafter, referred to as a second point) at the left side of the object.

For example, the system 100 may determine the location of the reference point 31, which is located at the default location as illustrated in FIG. 4(e), as any one point at the left of the object as illustrated in FIG. 4(f).

When the reference point is determined, the system 100 may extract first outline points from the LiDAR points based on the reference point (S205).

To this end, the system 100 may extract representative points from points of the object based on the reference point, and may extract outline points from the representative points by using a convex hull algorithm. The extraction of the representative points and the extraction of the outline points may be implemented according to a conventional method and thus the detailed description is omitted.

Referring to (b) and (c) of FIG. 4, in the case of the turning state of the proximate object, it can be seen that as the location of the reference point is changed from the default location to the right of the object as shown in (c) of FIG. 4, more outline points (first outline points) 43 are extracted than they are in the case of the default location as shown in (b) of FIG. 4. That is, by changing the location of the reference point to the right of the object instead of the default location, it can be seen that the loss of the first outline points for the right side of the object is less.

Also, referring to (e) and (f) of FIG. 4, in the turning state of the proximate object, the location of the reference point is changed to the left of the object as shown in (f) of FIG. 4, and thus more outline points (first outline points) 43 are extracted than they are in the case of the default location as shown in (e) of FIG. 4. That is, when the location of the reference point is changed to the left side of the object, it can be seen that the loss of the first outline points for the left lateral side of the object is less.

The system 100 may generate one or more virtual points based on a length of a line segment connecting two adjacent points among the first outline points (S207).

The system 100 may determine lengths of line segments connecting every two adjacent points of the first outline points.

The system 100 may determine the two points of a line segment the length of which is equal to or greater than a threshold value (e.g., x[m]) among the line segments.

Also, the system 100 may generate one or more virtual points between two outline points.

Figure 5:
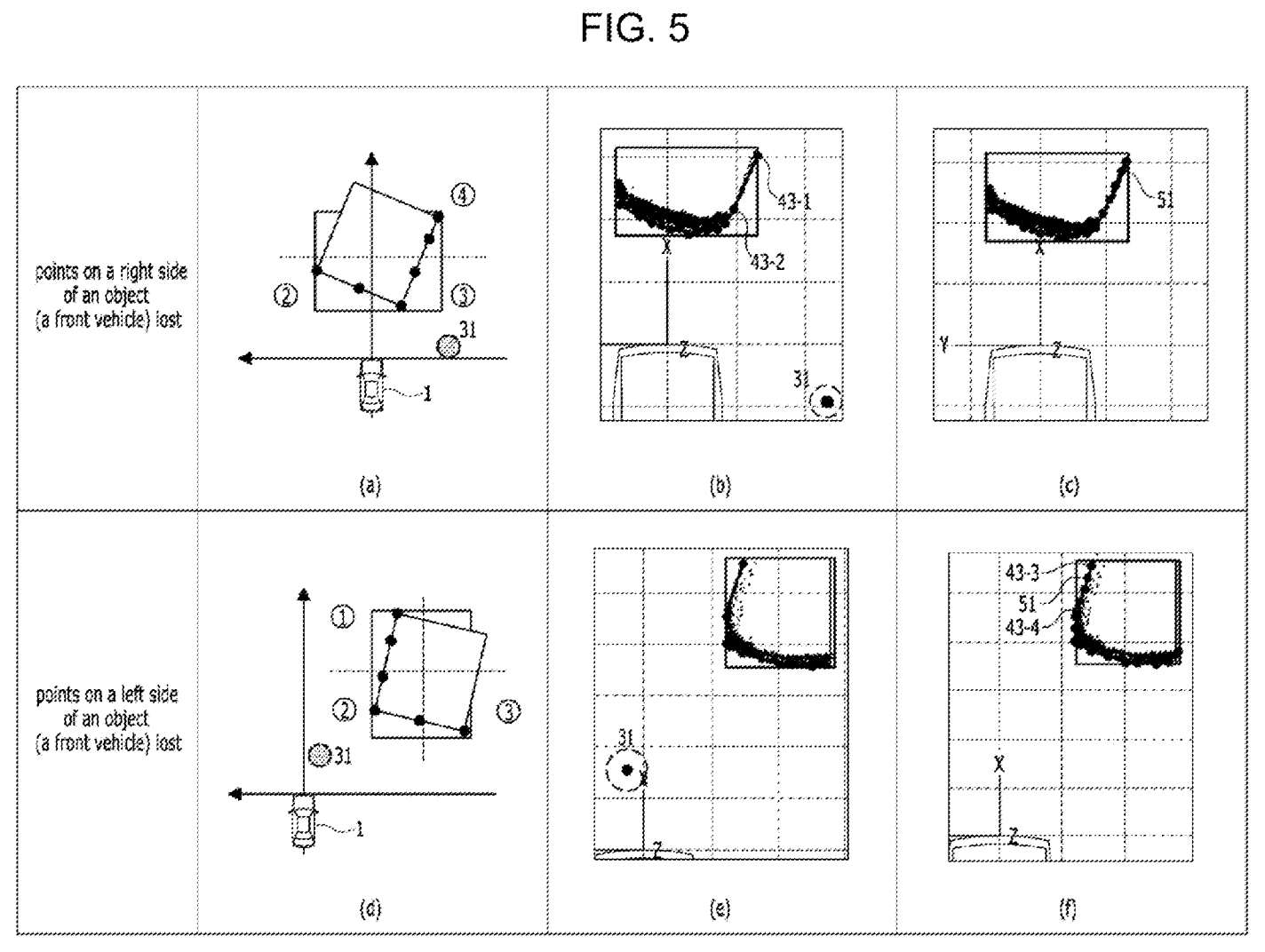

For example, the system 100 may determine one location to the right of the host vehicle 1 as the location of the reference point as illustrated in FIG. 5(a), and generate the virtual points 51 as illustrated in FIG. 5(c) when a line segment connecting the first point 43-1 and the second point 43-2 is equal to or greater than the threshold value as illustrated in FIG. 5(b).

In this case, the virtual points 51 may be generated to satisfy a predetermined minimum distance in between points. For example, the system 100 may generate virtual points 51 from the first point 43-1 and/or the second point 43-2 at predetermined intervals.

Also, for example, the system 100 may determine one location to the left of the subject vehicle 1 as the location of the reference point as illustrated in FIG. 5(d), and generate the virtual points 51 as illustrated in FIG. 5(f) when the length of the line segment connecting the third point 43-3 and the fourth point 43-4 is equal to or greater than the threshold value as illustrated in FIG. 5(e).

In this case, the virtual points 51 may be generated to satisfy the predetermined minimum distance. For example, the system 100 may generate virtual points 51 from the third point 43-3 and/or the fourth point 43-4 at predetermined intervals.

Next, the system 100 may generate a bounding box based on the second outline points which include the first outline points and the virtual points (S209).

Referring to FIG. 6, the system 100 may determine candidate directions based on the second outline points (S2091).

Figure 7:
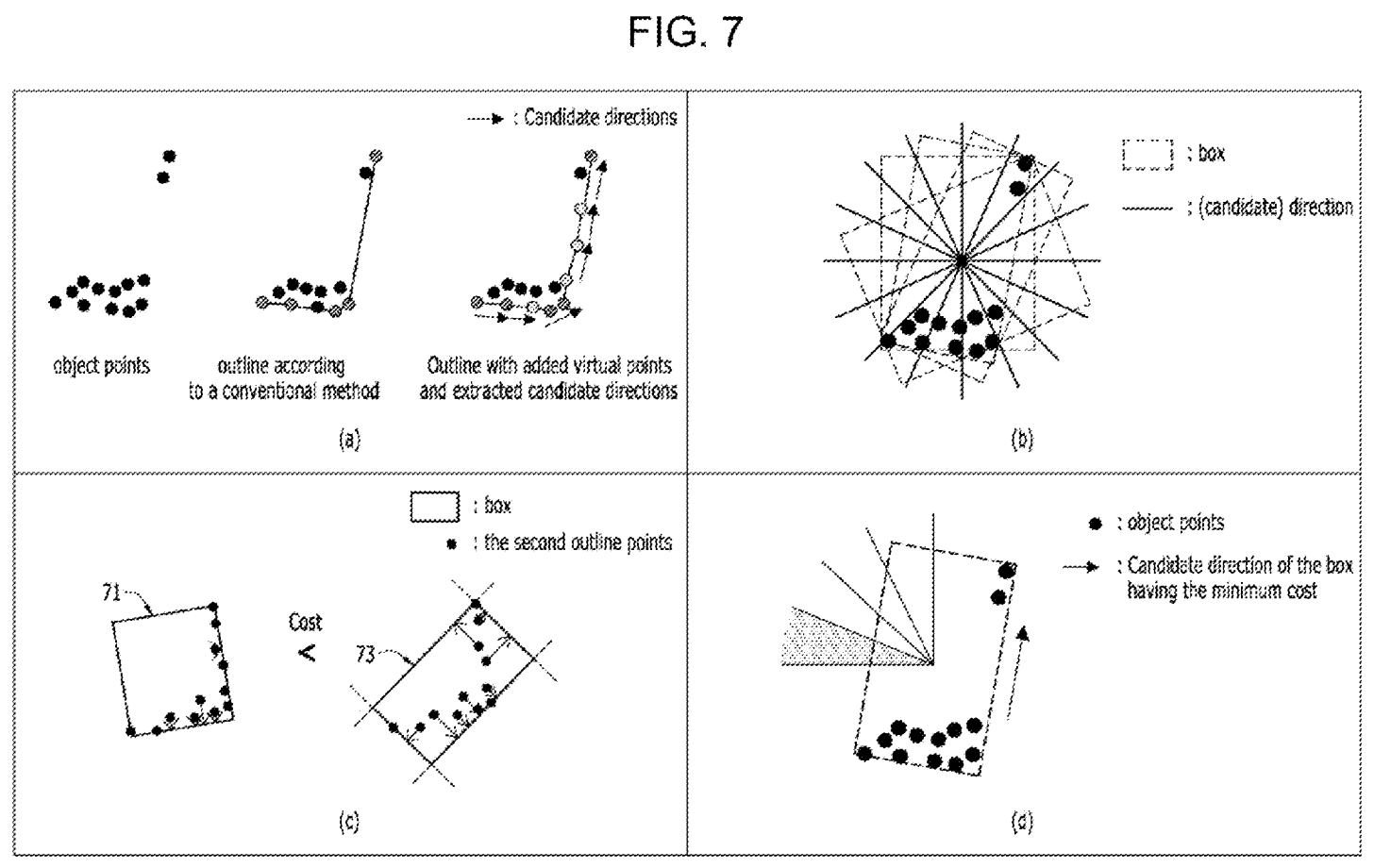

Referring to FIG. 7(a), the system 100 may extract first outline points from the LiDAR points of the object, generate virtual points according to the above-described operation S207, and then generate an outline connecting all of the first outline points and the virtual points.

That is, the outline may be generated by using the second outline points which include the first outline points and the virtual points.

The system 100 may determine a slope of each line segment connecting two adjacent points of the second outline points for its candidate direction. Here, each line segment may correspond to a portion of an outline.

The system 100 may generate a rectangular box surrounding the second outline points according to each candidate direction (S2093).

Referring to FIG. 7(b), a rectangular box that surrounds the second outline points and is inclined with a slope of each candidate direction is generated.

The system 100 may determine a cost that is a loss value of each box based on the distances of the respective second outline points to the corresponding nearest edge of the each box (S2095).

The system 100 may calculate a shortest or perpendicular distance from each second outline point to the nearest one among the edges of the box and a square of the distance, and determine a sum of the squares as a cost of the each box.

The system 100 may determine a box having a minimum cost as a bounding box of the corresponding object and determine the slope thereof as the heading angle (S2097).

FIG. 7(c) illustrates an example of calculating and comparing costs of boxes.

Referring to FIG. 7(c), the cost of the box 71 generated in the first candidate direction is less than that of the box 73 generated in the second candidate direction.

Referring to FIG. 7(d), the candidate direction corresponding to a box having a minimum cost may be determined as the heading direction, and the heading angle may be determined based on the slope of the candidate direction. The box may be determined as a bounding box of the corresponding object.

According to the above-described embodiments, it is possible to overcome the limit of the conventional method by which the number of LiDAR points corresponding to a lateral side surface of a proximate object is obtained insufficiently.

Figure 8:
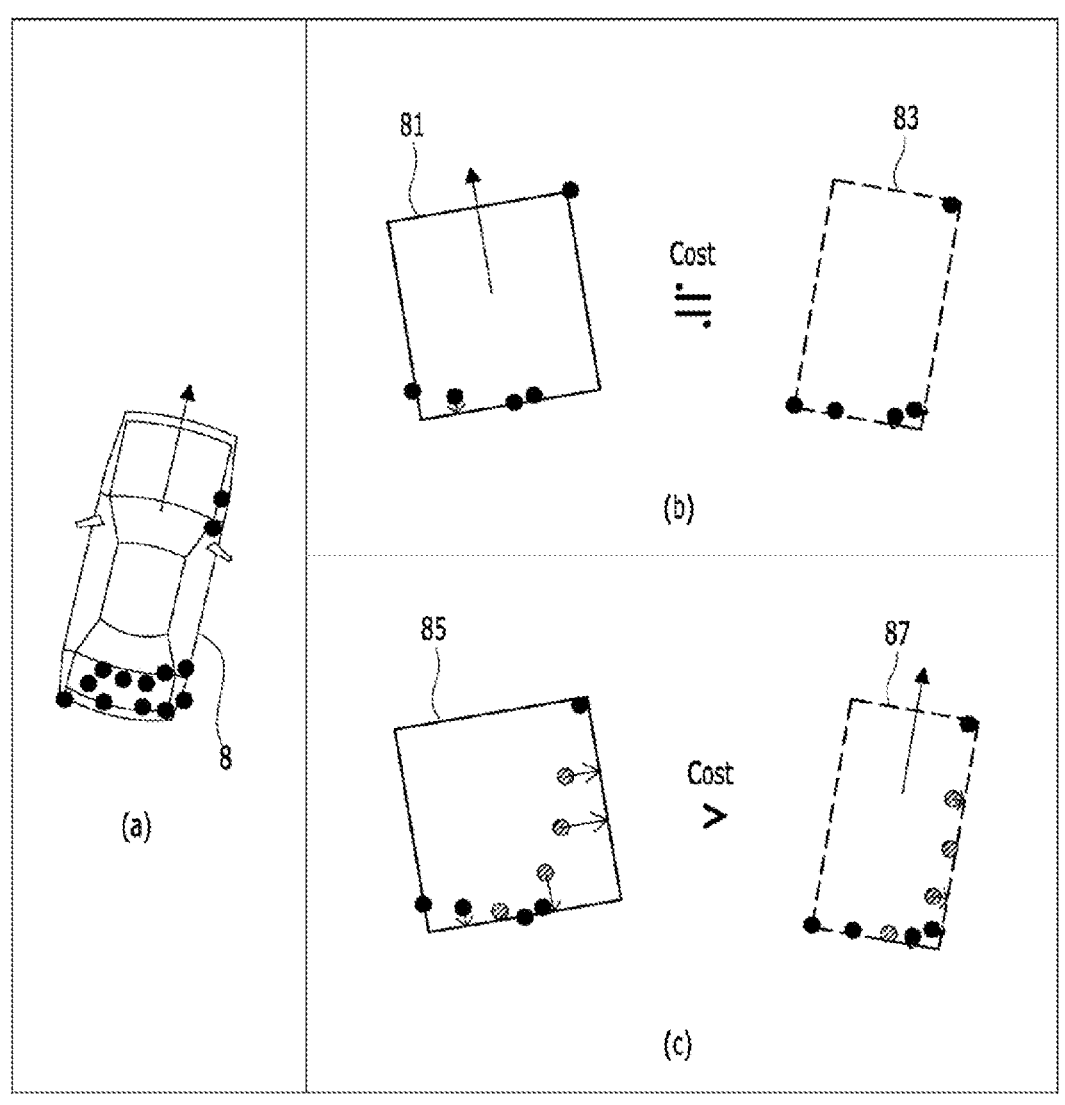
FIG. 8 is a diagram illustrating a result comparison between a conventional object detection technique and an object detection technique according to an embodiment of the present disclosure.

FIG. 8 shows a comparison of object detection results for the conventional method and the embodiments of the present disclosure.

When the vehicle 8 of FIG. 8(a) is assumed to be a proximate object, the result of FIG. 8(b) may be obtained according to the conventional method, and the result of FIG. 8(c) may be obtained according to an embodiment of the present disclosure.

Referring to FIG. 8(b), according to the conventional method, the heading direction according to the cost calculation and the bounding box determination may have a result different from the actual traveling direction of the vehicle 80 due to the lack of the points.

For example, according to the conventional method, the coat of the box 81 in a candidate direction different from the actual traveling direction of the vehicle 8 and the cost of the box 83 in a candidate direction corresponding to the actual traveling direction may be almost the same, and it results in that a detection result may be obtained differently from the actual traveling direction.

However, according to an embodiment of the present disclosure, the problem as shown in FIG. 8(b) may be solved.

According to an embodiment of the present disclosure, virtual points may be further considered as shown in FIG. 8(c), and since the side surface information of the vehicle 8 is supplemented, the correct traveling direction may be detected.

For example, according to embodiments of the present disclosure, the cost of the box 85 having a direction different from the actual travel direction of the vehicle 8 has a value greater than the cost of the box 87 having a direction corresponding to the actual travel direction.

The above-described embodiments may be implemented in the form of a recording medium for storing instructions executable by a computer. The instructions may be stored in the form of a computer program code, and when executed by a processor, may perform operations of the disclosed embodiments. The recording medium may be implemented as a non-transitory computer-readable recording medium.

The computer-readable recording medium includes all types of recording media in which computer-readable instructions are stored. For example, there may be a Read Only Memory (ROM), a Random Access Memory (RAM), a magnetic tape, a magnetic disk, a flash memory, an optical data storage device, etc.

What is claimed is:

1. A method of for controlling a vehicle including:

obtaining, by a Light Detection and Ranging (LiDAR) sensor mounted on the vehicle, a point cloud for objects in a region of interest of the vehicle while the vehicle travels;

determining, by a controller, whether an object in the region of interest is in a turning state or a straight moving state;

determining, by the controller, a location of a reference point for the object based on the determination, wherein the location of the reference point is differently determined when the object is determined in the turning state from when the object is determined in the straight moving state;

extracting, by the controller, first outline points from LiDAR points for the object, which are included in the point cloud received from the LiDAR sensor, based on the reference point;

generating, by the controller, at least one virtual point based on a length of a line segment connecting the first outline points;

generating, by the controller, a bounding box of the object corresponding to a heading direction of the object based on second outline points including the first outline points and the at least one virtual point; and

controlling, by the controller, driving of the vehicle based on the bounding box and the heading direction for the object.

2. The method of claim 1, wherein the determining of whether the object is in a turning state or a straight moving state includes:

determining two points corresponding to minimum and maximum values of y-axis which is a lateral axis with respect to the vehicle among the LiDAR points;

determining that the object is in the turning state when a slope of a line segment connecting the two points is less than a predetermined threshold slope; and determining that the object is in the straight moving state when the slope of the line segment is equal to or greater than the threshold slope.

3. The method of claim 1, wherein the determining a location of a reference point for the object includes:

in response to the object in the turning state, determining the location of the reference point based on locations of the LiDAR points in local quadrants of the vehicle; and in response to the object in the straight moving state, determining a location corresponding to one point of the vehicle as the location of the reference point.

4. The method of claim 3, wherein the local quadrants are generated based on a cluster box of the object generated based on the LiDAR points.

5. The method of claim 3, wherein in response to the object in the turning state, the determining a location of the reference point includes:

determining the location of the reference point as a first point at a right location from the object in response to the LiDAR points located in a second quadrant, a third quadrant, and a fourth quadrant among the local quadrants; and determining the location of the reference point as a second point at a left location from the object in response to the LiDAR points located in a first quadrant, the second quadrant, and the third quadrant among the local quadrants.

6. The method of claim 1, wherein the generating at least one virtual point includes:

determining two outline points of a line segment having a length equal to or greater than a predetermined threshold length among line segments connecting two adjacent points of the first outline points; and generating the at least one virtual point between the two outline points.

7. The method of claim 1, wherein the generating a bounding box of the object corresponding to a heading direction includes:

determining candidate directions based on the second outline points, generating a plurality of boxes, each box of the plurality of boxes surrounding the second outline points generated in each of the candidate directions, determining a cost for each box based on distances between the second outline points in the each box and nearest edges of the each box, each of the distances being a perpendicular distance from one of the second outline points to a corresponding nearest edge of the each box; and generating the bounding box having a heading angle corresponding to a direction of a box having a minimum cost among the plurality of boxes.

8. The method of claim 7, wherein the determining candidate directions includes:

determining each candidate direction based on a slope of each line segment connecting two adjacent points among the second outline points, wherein the each line segment corresponds to a portion of an outline of the object.

9. The method of claim 7, wherein the determining cost of each box includes:

calculating a square of the perpendicular distance for each of the second outline points; and determining a value obtained by summing all calculated squares of the perpendicular distances for the second outline points as the cost of the each box.

10. A vehicle, the system comprising:

a Light Detection and Ranging (LiDAR) sensor, mounted on the vehicle, configured to obtain a point cloud for objects in a region of interest of the vehicle while the vehicle travels; and a system configured to control the vehicle, wherein the system comprises:

an interface configured to receive the point cloud from the LiDAR sensor, the point cloud including LiDAR points for an object; and a processor configured to be in communication with or electrically connected to the interface, wherein the processor is configured to:

determine whether the object is in a turning state or a straight state in a region of interest, determine a location of a reference point for the object based on the determination, wherein the location of the reference point is differently determined when the object is determined in the turning state from when the object is determined in the straight moving state, extract first outline points of the object from the LiDAR points based on the reference point, generate at least one virtual point based on a length of a line segment connecting two adjacent points of the first outline points, determine a bounding box corresponding to a heading direction of the object based on second outline points which includes the first outline points and the at least one virtual point; and control driving of the vehicle based on the bounding box and the heading direction for the object.

11. The system of claim 10, wherein the processor is further configured to:

determine two points corresponding to minimum and maximum values of y-axis which is a lateral axis with respect to the vehicle among the LiDAR points, determine that the object is in the turning state when a slope of a line segment connecting the two points is less than a predetermined threshold slope, and determine that the object is in the straight moving state when the slope of the line segment is equal to or greater than the predetermined threshold slope.

12. The system of claim 10, wherein in response to the object in the turning state, the processor determines a location of a reference point based on locations of the LiDAR points in local quadrants and in response to the object in the straight moving state, the processor determines a location corresponding to one point of the vehicle as the location of the reference point.

13. The system of claim 12, wherein the local quadrants are generated based on a cluster box of the object generated based on the LiDAR points.

14. The system of claim 12, wherein, the processor determines the location of the reference point as a first point at a right location from the object in response to the LiDAR points located in a second quadrant, a third quadrant, and a fourth quadrant of the local quadrants, and the processor determines the location of the reference point as a second point at a left location from the object in response to the LiDAR points located in a first quadrant, the second quadrant, and the third quadrant of the local quadrants.

15. The system of claim 10, wherein the processor is further configured to determine two outline points of a line segment having a length equal to or greater than a predetermined threshold length among line segments connecting two adjacent points of the first outline points, and generate the at least one virtual point between the two outline points.

16. The system of claim 10, wherein the processor is further configured to determine candidate directions based on the second outline points, generate a plurality of boxes, each box of the plurality of boxes surrounding the second outline points generated in each of the candidate directions, determine a cost for each of the plurality of boxes based on distances between the second outline points in the each box and nearest edges of the each box, each of the distances being a perpendicular distance from one of the second outline points to a corresponding nearest edge of the each box, and determine the bounding box having a heading angle corresponding to a direction of a box having a minimum cost among the plurality of boxes.

17. The system of claim 16, wherein the processor is further configured to determine each candidate direction based on a slope of each line segment connecting two adjacent points of the second outline points, and wherein the each line segment corresponds to a portion of an outline of the object.

18. The system of claim 16, wherein the processor is configured to calculate a square of the perpendicular distance for each of the second outline points, and determine a value obtained by summing all calculated squares of the perpendicular distances for the second outline points as a cost of the each box.

* * * * *